3,826,644
Patented July 30, 1974

3,826,644
HERBICIDAL N'-ARYL-N-CHLOROCYCLO-ALKYLTHIO UREAS
John W. Kobzina, Berkeley, Joseph F. Moore, Richmond, and Gustave K. Kohn, Berkeley, Calif., assignors to Chevron Research Company, San Francisco, Calif.
No Drawing. Original application July 14, 1970, Ser. No. 54,855, now Patent No. 3,711,530. Divided and this application Nov. 2, 1972, Ser. No. 303,190
Int. Cl. A01n 9/12
U.S. Cl. 71—98    12 Claims

ABSTRACT OF THE DISCLOSURE

Compound of the formula

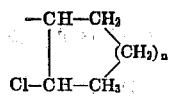

wherein R and R¹ are hydrogen, alkyl of 1 to 12 carbon atoms substituted with 0 or 4 halogen atoms of atomic number 9 to 35, cycloalkyl of 3 to 12 carbon atoms substituted with 0 to 4 halogen atoms of atomic number 9 to 35, aryl of 6 to 12 carbon atoms substituted with 0 to 4 halogen atoms of atomic number 9 to 35, nitro groups or alkoxy groups of 1 to 6 carbon atoms; R² is alkyl of 1 to 10 carbon atoms substituted with 0 to 4 halogen atoms of atomic number 17 to 35, cycloalkyl of 5 to 10 carbon atoms substituted with 0 to 4 halogen atoms of atomic number 17 to 35; and R³ is either (a)

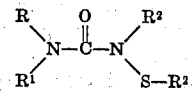

wherein $n$ is an integer of from 1 to 8, or (b)            monochloronorbornyl

The compounds are herbicides.

---

This is a division of application Ser. No. 54,855, filed July 14, 1970, now U.S. Pat. 3,711,530.

FIELD OF THE INVENTION

The present invention is directed to N-substituted-N-chlorocycloalkylthio ureas, their method of preparation and their use as herbicides.

DESCRIPTION OF THE INVENTION

The ureas of the present invention may be represented by the formula

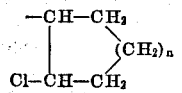

wherein R and R¹ (which may be the same or different) are hydrogen, alkyl of 1 to 12 carbon atoms optionally substituted with halogen atoms of atomic number 9 to 35 (fluorine, chlorine or bromine), cycloalkyl of 3 to 12 carbon atoms optionally substituted with halogen atoms of atomic number 9 to 35, aryl of 6 to 12 carbon atoms optionally substituted with halogen atoms of atomic number 9 to 35, nitro groups or alkoxy groups individually having 1 to 6 carbon atoms; R² is alkyl of 1 to 10 carbon atoms optionally substituted with halogen atoms of atomic number 17 to 35, preferably 0 to 4 halogen atoms, cycloalkyl of 5 to 10 carbon atoms optionally substituted with halogen atoms of atomic number 17 to 35, preferably 0 to 4 halogen atoms; and R³ is either (a)

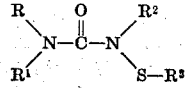

wherein $n$ is an integer from 1 to 8, or (b)            monochloronorbornyl

R and R¹ are preferably hydrogen, alkyl of 1 to 12, more preferably 1 to 4 carbon atoms substituted with 0 to 4 halogen atoms of atomic number 9 to 35 (i.e., the alkyl may or may not be substituted with halogen atoms; if substituted the number of halogens will be from 1 to 4), cycloalkyl of 3 to 12 carbon atoms substituted with 0 to 4 halogen atoms of atomic number 9 to 35, aryl of 6 to 12 carbon atoms substituted with 0 to 4 halogen atoms of atomic number 9 to 35, nitro groups or alkoxy groups wherein the alkyl portion is from 1 to 6 carbon atoms. Preferably, the total number of substituents on the aromatic nucleus of the aryl radical will not exceed 4.

Still more preferably in the above formula R represents phenyl; phenyl substituted with 1 to 4 halogen atoms of atomic number 9 to 35, nitro groups, alkyl groups individually of 1 to 4 carbon atoms or alkoxy groups individually of 1 to 4 carbon atoms, and R¹ is hydrogen or alkyl of 1 to 4 carbon atoms optionally substituted with 0 to 4 halogen atoms of atomic number 9 to 35. Still more preferably R¹ is hydrogen.

R² is preferably alkyl of 1 to 6 carbon atoms substituted with 0 to 4 halogen atoms of atomic number 17 to 35, preferably 1 to 2 halogen atoms of atomic number 17 to 35, cycloalkyl of 5 to 6 carbon atoms substituted with 0 to 4 halogen atoms of atomic number 17 to 35, preferably 1 to 2 halogen atoms of atomic number 17 to 35. Still more preferably R² is alkyl of 1 to 4 carbon atoms substituted with 0 to 2 halogen atoms of atomic number 17 to 35, preferably chlorine.

R³ above as indicated may be either a chlorocycloalkyl group wherein $n$ is an integer of from 1 to 8 and more preferably of from 1 to 4 and still more preferably of from 1 to 2 or a monochloronorbornyl group.

Representative groups which R and R¹ may represent include hydrogen, methyl, ethyl, n-propyl, isopropyl, n-butyl, isobutyl, pentyl, hexyl, heptyl, octyl, nonyl, decyl, undecyl, dodecyl, chloromethyl, bromomethyl, 1,2-dichloroethyl, cyclopropyl, cyclopentyl, cyclohexyl, cyclooctyl, chlorocyclohexyl, fluorocyclohexyl, phenyl, naphthyl, biphenyl, chlorophenyl, bromophenyl, fluorophenyl, 2,2-dichlorophenyl, 4-chlorophenyl, 2-fluoro-4-chlorophenyl, 2-nitrophenyl, 2,4-dinitrophenyl, methoxyphenyl, ethoxyphenyl fluoronaphthyl, chloronaphthyl, etc.

Representative R² groups are methyl, ethyl, n-propyl, isopropyl, n-butyl, isobutyl, pentyl, hexyl, heptyl, octyl, nonyl, decyl, 2-methylbutyl, 3-methylpentyl, chloromethyl, bromomethyl, 1,2-dichloroethyl, cyclopentyl, cyclohexyl, etc.

Representative R³ groups are 2-chlorocyclopentyl, 2-chlorocyclohexyl, 2-chlorocyclooctyl, 2-chlorocyclododecyl, and monochloronorbornyl.

Representative compounds of the present invention include:

N-methyl-N-(2-chlorocyclopentylthio) urea,
N-methyl-N-(2-chlorocyclopentylthio)-N'-methyl urea,
N-methyl-N-(2-chlorocyclopentylthio)-N'-dimethyl urea,
N-methyl-N-(2-chlorocyclopentylthio)-N'-ethyl-N'-methyl urea,
N-methyl-N-(2-chlorocyclopentylthio)-N'-n-butyl urea,
N-methyl-N-(2-chlorocyclopentylthio)-N'-n-hexyl urea, N-methyl-N-(2-chlorocyclopentylthio)-N'-2-methylhexyl urea,
N-methyl-N-(2-chlorocyclopentylthio)-N'-phenyl urea,
N-methyl-N-(2-chlorocyclopentylthio)-N'-naphthyl urea,
N-methyl-N-(2-chlorocyclopentylthio)-N'-2-fluoromethyl urea,
N-methyl-N-(2-chlorocyclopentylthio)-N'-2-chlorophenyl urea,
N-methyl-N-(2-chlorocyclopentylthio)-N'-3-chlorophenyl urea,
N-methyl-N-(2-chlorocyclopentylthio)-N'-4-nitrophenyl urea,
N-methyl-N-(2-chlorocyclopentylthio)-N'-methoxyphenyl urea,
N-methyl-N-(2-chlorocyclopentylthio)-N'-4-methoxyphenyl-N'-methyl urea,
N-methyl-N-(2-chlorocyclohexylthio)-urea,
N-methyl-N-(2-chlorocyclohexylthio)-N'-methyl urea,
N-methyl-N-(2-chlorocyclohexylthio)-N'-phenyl urea,
N-methyl-N-(2-chlorocyclohexylthio)-N'-2-chlorophenyl urea,
N-methyl-N-(2-chlorocyclohexylthio)-N'-4-methoxyphenyl urea,
N-ethyl-N-(2-chlorocyclohexylthio) urea,
N-ethyl-N-(2-chlorocyclohexylthio)-N'-phenyl urea,
N-ethyl-N-(2-chlorocyclohexylthio)-N'-3-nitrophenyl urea,
N-ethyl-N-(2-chlorocyclohexylthio)-N'-3-nitrophenyl-N'-methyl urea,
N-butyl-N-(2-chlorocyclohexylthio) urea,
N-butyl-N-(2-chlorocyclohexylthio)-N'-phenyl urea,
N-cyclohexyl-N-(2-chlorocyclohexylthio)-N'-phenyl urea,
N-chloromethyl-N-(2-chlorocyclohexylthio)-N'-phenyl urea,
N-methyl-N-(2-chlorocycloheptylthio)-N'-phenyl urea,
N-methyl-N-(2-chlorocyclooctylthio)-N'-phenyl urea,
N-methyl-N-(2-chlorocyclononylthio)-N'-phenyl urea,
N-methyl-N-(2-chlorocyclodecylthio)-N'-phenyl urea,
N-methyl-N-(2-chlorocyclododecylthio)-N'-phenyl urea,
N-methyl-N-(monochloronorbornylthio)-N'-phenyl urea,
N-methyl-N-(monochloronorbornylthio)-N'-2-fluorophenyl urea,
N-methyl-N-(monochloronorbornylthio)-N'-3-chlorophenyl-N'-methyl urea, etc.

Compounds of the present invention may be prepared by the following reaction steps (I) 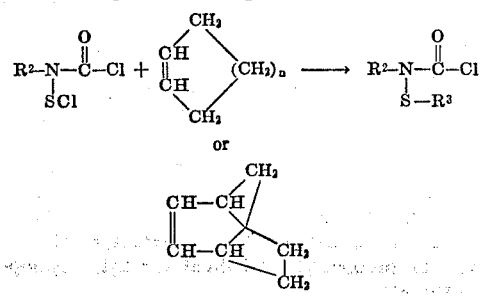

(II) 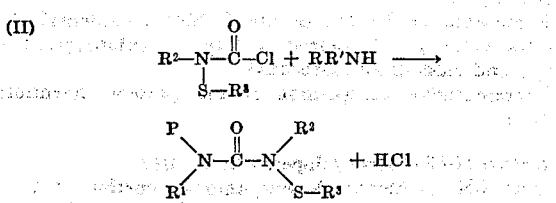

Generally the reaction product of Step I will not be separately recovered or isolated; rather the amine shown in Step II will be directly added to the reaction product of Step I without isolation.

The temperature for the above reaction will generally range from −30 to 130° C., more preferably from −5 to 50° C. The pressure is not critical and can be atmospheric or autogenous. The reaction time will generally run from ¼ hour to a day or more and more usually in the range from 4 hours to 24 hours.

A solvent will generally be used for the above reaction. Benzene is particularly suitable; however, other solvents such as xylene and chlorinated hydrocarbons, e.g., methylene chloride or chloroform can be used. Aprotic solvents not miscible with water can also be used and include such compounds as ether, etc. Generally the solvent will be present in an amount of 5 to 25 times the volume of reactants.

For the reactions above, particularly for Step II, a hydrogen halide acceptor is desirable preferably in at least stoichiometric amounts to the HCl produced. When the amine is an aromatic amine, it can be used in excess as a basic acceptor for the HCl; however, this is generally not practical. Other halogen halide acceptors are preferred such as triethyl amine or pyridine.

In the above reaction it is generally preferred that stoichiometric amounts of reactants be used. However in Step I the carbamoyl chloride may be present in less than the equimolar amount and in Step II the amine may be present in excess. However, it is generally desired that the cyclic or bicyclic reactant of Step I not be in excess of 1 mole per mole of other reactant and that the amine in Step II not be in excess of 2.1 moles per mole of the other reactant.

Generally any amine chloride formed in the above reaction can be removed by filtration and excess solvent removed under vacuum. The desired urea product of the present invention can then be purified by chromatography or recrystallization from suitable solvents.

It is difficult to be precise as to the relative positions of the chlorine and sulfur atoms attached to the norbornyl radical. As shown for Step I above, norbornylene is reacted with a carbamoyl chloride to produce the desired carbamate of the present invention. However, due to well-known possible multiple rearrangements under the conditions of the addition reaction of Step I, one of two possible monochloronorbornyl groups, or a mixture thereof, is formed. Either 2-chloronorborn-7-yl (2-chlorobicyclo[2.2.1]hept-7-yl) or 3-chloronorborn-2-yl (3-chlorobicyclo[2.2.1]hept-2-yl) or a mixture of the two can be the resulting $R^3$ group. For convenience of expression, the term "monochloronorbornyl" is used to describe either of the two possible structures or their mixture.

The carbamoyl chlorides which are used as reactants in Step I are made by the reaction of isocyanate and $SCl_2$ in accordane with the following reaction:

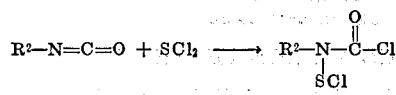

wherein $R^2$ is the same as defined above. The sulfur dichloride/isocyanate molar ratio should be at least 1:1. The sulfur dichloride is preferably present in excess. For best results it is necessary that the sulfur dichloride be in excess of 95%, preferably 99%, pure.

The reaction can be accomplished in the presence of a suitable inert organic solvent or neat. Preferably the solvent is low boiling and easily removed by a low temperature stripping operation. Examples of suitable solvents include: dichloromethane, diethylether, tetrahydrofuran and dimethylfuran.

Sufficient solvent is used to dissolve the reactants. In general it is sufficient to use about 25 to 200 ml. of solvent for each 0.1 mole isocyanate. Preferably 50 to 100 ml. is used.

The reaction of the isocyanate and sulfur dichloride is preferably accomplished in the presence of a suitable catalyst, such as for example dibutyl tin dilaurate, tetraethyl ammonium chloride and triethyl amine. The preferred catalyst is tetraethylammonium chloride. Although the reaction will also proceed without the presence of a catalyst, a catalyst is preferred. Generally about 1% to 60% by weight of catalyst based on isocyanate is sufficient. Preferably the catalyst is removed before isolation of the carbamoyl chloride product or before in situ reaction with a suitable reactant to produce the herbicidal product described further hereinafter.

The reaction is preferably accomplished at a temperature of from −50 to 100° C. and at ambient or autogenous pressure. The reaction time will generally run from ¼ to 72 hours, more usually ⅓ to 24 hours.

The carbamoyl chloride product can be recovered by stripping sulfur dichloride and then distilling the desired product from the mixture. When the catalyst is insoluble, the carbamoyl chloride product can be recovered by stripping sulfur dichloride, filtering the insoluble catalyst and then evaporating off the low boiling solvent.

The present invention can be more usually understood by reference to the following examples.

EXAMPLES

Example 1

Preparation of N-methyl-N-(2-chlorocyclohexylthio)-N'-(4-chlorophenyl) urea.—5 ml. of N-methyl-N-chlorothio carbamoyl chloride was added to 33 ml. of cyclohexene and cooled in ice. The reaction mixture was stirred several hours, then the excess cyclohexene removed under vacuum. The resultant carbamoyl chloride product was diluted with 10 ml. of benzene, then 8 g. of 4-chloroaniline and 105 ml. of benzene were added and the reaction mixture stirred overnight at room temperature. Following removal of the aniline hydrochloride by filtration, the filtrate was washed with 25 ml. of 10% hydrochloric acid and then with 25 ml. of water. The washed solution of product was dried over magnesium sulfate and the solvent removed under vacuum. The crude product was chromatographed on silica gel, eluting with varying mixtures of petroleum ether and diethyl ether. The isolated product was a white crystalline solid, had a melting point of 80 to 82° C. and showed the following chemical analysis:

|  | Calculated | Found |
|---|---|---|
| Cl, percent | 21.28 | 21.68 |
| S, percent | 9.62 | 10.10 |
| N, percent | 8.41 | 8.12 |

Example 2

Preparation of N-methyl - N - (monochloronorbornylthio)-N'-(4-chlorophenyl) urea.—20 g. of N-methyl-N-chlorothio carbamoyl chloride was added at 0° C. to 12 g. of 2,3-bicyclo[2.2.1]heptene (norbornylene) in 50 ml. of benzene and the reaction mixture stirred for 1½ hours at 0° C. 32 g. of 4-chloroaniline and 150 ml. of benzene was then added dropwise and the mixture stirred for 20 hours at room temperature. The aniline-hydrochloride precipitate was removed by filtration and the filtrate washed twice with 50 ml. portions of 5% hydrochloric acid and then once with 50 ml. of water. The washed solution of product was dried over magnesium sulfate and filtered and the solvent then removed under vacuum. The product after being recrystallized from chloroform-petroleum ether had a melting point of 79–80° C. and had the following chemical analysis:

|  | Calculated | Found |
|---|---|---|
| Cl, percent | 20.54 | 16.50 |
| S, percent | 9.29 | 8.93 |
| N, percent | 8.11 | 7.76 |

Other urea compounds of the present invention were prepared generally by the methods of Examples 1 and 2 and are reported in Table I.

TABLE I

| | Cl Calc. | Cl Found | S Calc. | S Found | N Calc. | N Found | Melting point, °C. |
|---|---|---|---|---|---|---|---|
| N-methyl-N-(2-chlorocyclohexylthio)-N'-(2-fluorophenyl) urea | 11.19 | 11.18 | 10.12 | 9.28 | | | Oil |
| N-methyl-N-(2-chlorocyclohexylthio) urea | 15.85 | 15.70 | 14.33 | 14.55 | 12.52 | 11.68 | 108 |
| N-methyl-N-(2-chlorocyclohexylthio)-N'-phenyl urea | 11.86 | 9.72 | 10.35 | 10.11 | | | Oil |
| N-methyl-N-(2-chlorocyclohexylthio)-N',N'-dimethyl urea | 14.14 | 13.50 | 12.78 | 11.95 | | | Oil |
| N-methyl-N-(2-chlorocyclohexylthio)-N'-(4-methylphenyl) urea | 11.33 | 11.40 | 10.25 | 10.03 | 8.95 | 8.92 | 78 |
| N-methyl-N-(2-chlorocyclohexylthio)-N'-(4-methoxyphenyl) urea | 10.78 | 10.42 | 9.75 | 9.81 | 8.52 | 8.42 | 71–73 |
| N-n-butyl-N-(2-chlorocyclohexylthio)-N'-(4-chlorophenyl) urea | 8.50 | 8.87 | 18.90 | 19.55 | 7.50 | 6.12 | Oil |
| N-methyl-N-(2-chlorocyclopentylthio)-N'-(4-chlorophenyl) urea | 22.21 | 22.00 | 10.04 | 9.93 | 8.77 | 8.34 | 49 |
| N-methyl-N-(monochloronorbornylthio) urea | 15.10 | 15.00 | 13.66 | 13.35 | 11.94 | 11.28 | 128–131 |
| N-methyl-N-(monochloronorbornylthio)-N'-(4-methylphenyl) urea | 10.91 | 8.93 | 9.87 | 9.42 | 8.62 | 8.38 | 59–61 |
| N-methyl-N-(monochloronorbornylthio)-N'-phenyl urea | 10.59 | 9.75 | 9.58 | 10.16 | | | Oil |

UTILITY

The ureas of the present invention are, in general, herbicidal in both pre- and post-emergence applications. For pre-emergence control of undesirable vegetation these ureas will be applied in herbicidal quantities to the environment, e.g., soil infested with seeds and/or seedlings of such vegetation. Such application will inhibit the growth of or kill the seeds, germinating seeds and seedlings. For post-emergence applications the ureas of the present invention will be applied directly to the foliage and other plant parts. Generally they are effective against weed grasses as well as broadleaved weeds. Some may be selective with respect to type of application and/or type of weed.

Pre- and post-emergence herbicidal tests on representative ureas of this invention were made using the following methods:

Pre-Emergence Test

An acetone solution of the test ureas was prepared by mixing 750 mg. urea, 220 mg. of a nonionic surfactant and 5 ml. of acetone. This solution was added to approximately 125 ml. of water containing 156 mg. of surfactant.

Seeds of the test vegetation were planted in a pot of soil and the urea solution was sprayed uniformly onto the soil surface at a dose of 100 mg. per cm.$^2$. The pot was watered and placed in a greenhouse. The pot was watered intermittently and was observed for seedling emergence, health of emerging seedlings, etc. for a 3-week period. At the end of this period the herbicidal effectiveness of the urea was rated based on the physiological observations. A 0 to 100 scale was used; 0 representing no phytotoxicity, 100 representing complete kill.

Post-Emergence Test

The test urea was formulated in the same manner as described above for the pre-emergence test. The concentration of the urea in this formulation was 5000 p.p.m. This formulation was uniformly sprayed on 2 replicate pots of 24-day-old plants (approximately 15 to 25 plants per pot) at a dose of 100 mg. per cm.$^2$. After the plants had dried, they were placed in a greenhouse and then watered intermittently at their bases are needed. The plants were observed periodically for phytotoxic effects and physiological and morphological responses to the treatment. After 3 weeks the herbicidal effectiveness of the urea was rated based on these observations. A 0 to 100 scale was used; 0 representing no phytotoxicity, 100 representing complete kill.

The results of these tests appear in Table II.

(a) 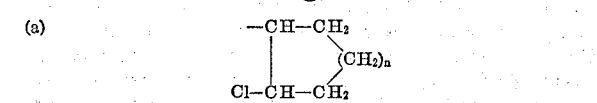

TABLE II

| Compound | Herbicidal effectiveness, pre/post | | | | | |
|---|---|---|---|---|---|---|
| | O | W | C | M | P | L |
| N-methyl-N-(2-chlorocyclohexylthio)-N'-(4-chlorophenyl) urea | 98/100 | 100/100 | 99/100 | 100/100 | 100/100 | 100/100 |
| N-methyl-N-(2-chlorocyclohexylthio)-N'-(2-fluorophenyl) urea* | 100/100 | 98/95 | 99/83 | 98/100 | 100/100 | 95/100 |
| N-methyl-N-(2-chlorocyclohexylthio) urea | | 35/— | | 15/— | —/20 | —/20 |
| N-methyl-N-(2-chlorocyclohexylthio)-N'-phenyl urea | 100/93 | 100/85 | 100/79 | 100/100 | 100/100 | 100/100 |
| N-methyl-N-(2-chlorocyclohexylthio)-N',N'-dimethyl urea | | —/20 | 65/— | 65/— | —/40 | —/20 |
| N-methyl-N-(2-chlorocyclohexylthio)-N'-(4-methylphenyl) urea | 100/85 | 100/70 | 100/30 | 100/95 | 100/100 | 100/100 |
| N-methyl-N-(2-chlorocyclohexylthio)-N'-(4-methoxyphenyl) urea | 96/35 | 98/25 | 100/— | 100/85 | 100/90 | 100/90 |
| N-n-butyl-N-(2-chlorocyclohexylthio)-N'-(4-chlorophenyl) urea | 30/95 | —/95 | —/100 | 67/— | 37/100 | 67/100 |
| N-methyl-N-(2-chlorocyclopentylthio)-N'-(4-chlorophenyl) urea | 100/100 | 100/100 | 100/100 | 100/100 | 100/100 | 100/100 |
| N-methyl-N-(monochloronorbornylthio)-N'-(4-chlorophenyl) urea | 50/10 | 97/100 | 97/100 | 100/— | 100/100 | 100/100 |
| N-methyl-N-(monochloronorbornylthio) urea | 37/— | 27/— | | 30/— | 57/— | 43/— |
| N-methyl-N-(monochloronorbornylthio)-N'-(4-methylphenyl) urea | 33/100 | 33/100 | 100/100 | 98/100 | 100/100 | 100/100 |
| N-methyl-N-(monochloronorbornylthio)-N'-phenyl urea | 100/83 | 98/— | 100/— | 100/98 | 100/70 | 96/100 |

*33 micrograms/cm.² application.

NOTE.—O=Wild Oats (*Avena fatua*); W=Watergrass (*Echinochloa crusgalli*); C=Crabgrass (*Digitaria sanguinalis*); M=Mustard (*Brassica arvensis*); P=Pigweed (*Amaranthus retroflexus*); L=Lambsquarter (*Chenopodium album*).

The amount of urea administered will vary with the particular plant part or plant growth medium which is to be contacted, the general location of application, i.e., sheltered areas such as greenhouses as compared to exposed areas such as fields, as well as the desired type of control. For pre-emergent control of most plants dosages in the range of about 0.5 to 20 lbs. per acre will be used. Such administration will give a concentration of about 2 to 80 p.p.m. urea distributed throughout 0.1 acre-foot. For post-emergence application, such as foliar spray application, compositions containing about 0.5 to 8 lbs. urea per 100 gal. spray will be used. Such application is equivalent to about 0.5 to 20 lbs. urea per acre.

The herbicidal compositions of this invention comprise a herbicidal amount of one or more of the above described ureas intimately admixed with a biologically inert carrier. The carrier may be a liquid diluent such as water or acetone or a solid. The solid may be in the form of dust powder or granules. These compositions will also usually contain adjuvants such as a wetting or dispersing agent to facilitate their penetration into the plant growth media or plant tissue and generally enhance their effectiveness. These compositions may also contain other pesticides, stabilizers, conditioners, fillers and the like.

As will be evident to those skilled in the art, various modifications on this invention can be made or followed, in the light of the foregoing disclosure and discussion, without departing from the spirit or scope of the disclosure or from the scope of the following claims.

We claim:

1. Herbicidal composition comprising a biologically inert carrier and an herbicidally effective amount of a compound of the formula

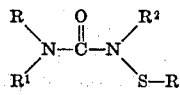

wherein R is phenyl, phenyl substituted with 1 to 4 halogen atoms of atomic number 9 to 35, nitro groups or alkyl groups individually of 1 to 4 carbon atoms, alkoxy groups individually having 1 to 6 carbon atoms, $R^1$ is hydrogen or alkyl of 1 to 4 carbon atoms; $R^2$ is alkyl of 1 to 4 carbon atoms and $R^3$ is either wherein $n$ is an integer of from 1 to 4, or (b) monochloronorbornyl, selected from 2-chloronorborn-7-yl, 3-chloronorborn-2-yl or a mixture thereof.

2. Composition of Claim 1 wherein R is phenyl substituted with 1 to 4 halogen atoms of atomic number 9 to 35 or alkyl groups of 1 to 4 carbon atoms.

3. Composition of Claim 2 wherein $R^1$ is hydrogen, $R^2$ is methyl and $R^3$ is 2-chlorocyclohexyl or 2-chlorocyclopentyl.

4. Composition of Claim 3 wherein R is 4-chlorophenyl.

5. Composition of Claim 3 wherein R is 2-fluorophenyl.

6. Method for controlling the growth of undesirable vegetation which comprises applying to the vegetation or the growth media of the vegetation a herbicidally effective amount of the compound of Claim 1.

7. Method of Claim 6 wherein R is phenyl substituted with 1 to 4 halogen atoms of atomic number 9 to 35 or alkyl groups of 1 to 4 carbon atoms.

8. Method of Claim 7 wherein $R^1$ is hydrogen, $R^2$ is methyl and $R^3$ is 2-chlorocyclohexyl or 2-chlorocyclopentyl.

9. Method of Claim 8 wherein R is 4-chlorophenyl.

10. Method of Claim 8 wherein R is 2-fluorophenyl.

11. Composition of Claim 5 wherein $R^3$ is 2-chlorocyclohexyl.

12. Method of Claim 10 wherein $R^3$ is 2-chlorocyclohexyl.

References Cited

UNITED STATES PATENTS

| | | | |
|---|---|---|---|
| 3,699,163 | 10/1972 | Kohn | 71—120 |
| 3,697,572 | 10/1972 | Brown | 260—453 R |
| 2,868,633 | 1/1959 | Goodhue | 71—98 |
| 3,142,554 | 7/1964 | Godfrey | 71—98 |
| 3,001,861 | 9/1961 | Fischer et al. | 71—119 |
| 3,496,208 | 2/1970 | Bachman et al. | 260—453 R |
| 3,502,705 | 3/1970 | Brown | 260—453 R |
| 3,234,275 | 2/1966 | Malz et al. | 71—98 |
| 3,344,153 | 9/1967 | Kuhle et al. | 260—453 R |
| 3,347,658 | 10/1967 | Luckenbaugh | 71—119 |
| 3,351,457 | 11/1967 | Luckenbaugh | 71—120 |
| 3,352,662 | 11/1967 | Klopping et al. | 71—120 |
| 3,124,447 | 3/1964 | Wineman et al. | 71—103 |
| 3,652,630 | 3/1972 | Brown | 71—67 |

GLENNON H. HOLLRAH, Primary Examiner